United States Patent
Iwasaki-Higbee (10) Patent No.: US 10,927,539 B2
(45) Date of Patent: Feb. 23, 2021

(54) METHOD AND APPARATUS FOR CLEANING LARGE PIPES, SUCH AS STORM DRAIN CONDUITS

(71) Applicant: Jeffrey L. Iwasaki-Higbee, Kaneohe, HI (US)

(72) Inventor: Jeffrey L. Iwasaki-Higbee, Kaneohe, HI (US)

(*) Notice: Subject to any disclaimer, the term of this patent is extended or adjusted under 35 U.S.C. 154(b) by 166 days.

(21) Appl. No.: 15/910,303

(22) Filed: Mar. 2, 2018

(65) Prior Publication Data
US 2019/0271143 A1 Sep. 5, 2019

(51) Int. Cl.
| | |
|---|---|
| *B08B 3/02* | (2006.01) |
| *E03F 9/00* | (2006.01) |
| *B08B 3/14* | (2006.01) |
| *B08B 9/032* | (2006.01) |
| *B01D 21/01* | (2006.01) |
| *C02F 1/38* | (2006.01) |

(Continued)

(52) U.S. Cl.
CPC .............. *E03F 9/007* (2013.01); *B01D 21/01* (2013.01); *B01D 21/262* (2013.01); *B01D 21/265* (2013.01); *B01D 33/056* (2013.01); *B03B 9/00* (2013.01); *B08B 3/02* (2013.01); *B08B 3/14* (2013.01); *B08B 9/0321* (2013.01); *B08B 9/0495* (2013.01); *C02F 1/004* (2013.01); *C02F 1/385* (2013.01); *C02F 1/52* (2013.01); *C02F 11/123* (2013.01); *B07B 2201/04* (2013.01); *B07B 2230/01* (2013.01)

(58) Field of Classification Search
CPC ........... B01D 33/056; B03B 9/00; B08B 3/02; B08B 3/14; B08B 9/0321; B08B 9/0495; C02F 1/004; C02F 1/385; C02F 1/52; C02F 11/123; B07B 2201/04; B07B 2230/01

USPC .................................................... 134/169 C
See application file for complete search history.

(56) References Cited

U.S. PATENT DOCUMENTS

| | | |
|---|---|---|
| 3,526,547 A | 9/1970 | Shock |
| 4,073,302 A | 2/1978 | Jones |

(Continued)

FOREIGN PATENT DOCUMENTS

KR         100618919 B1 *   8/2006

OTHER PUBLICATIONS

KR100618919B1—Machine translation (Year: 2006).*

(Continued)

*Primary Examiner* — Tinsae B Ayalew
(74) *Attorney, Agent, or Firm* — Chernoff Vilhauer LLP (57) ABSTRACT

Apparatus and a method for cleaning accumulated sediment from storm drain conduits and other large-diameter conduits. A nozzle assembly is arranged to deliver a high-volume flow of water at a pressure high enough to loosen sediment from the interior of a conduit and to propel the nozzle assembly and an associated nozzle feed hose upstream within a conduit being cleaned. Water from the nozzle assembly flushes the sediment downstream and is then collected, partially cleaned, and reused in the nozzle assembly. Mud and clay may be left in the water to increase its specific gravity and viscosity. A self-contained portable and mobile system includes a tank and apparatus for removal of high concentrations of entrained or suspended solids, and a pump and conduits for delivering a high-volume flow of water, containing quantities of suspended solids, to the nozzle assembly.

24 Claims, 6 Drawing Sheets

(51) Int. Cl.
*B01D 21/26* (2006.01)
*C02F 1/00* (2006.01)
*C02F 11/123* (2019.01)
*C02F 1/52* (2006.01)
*B01D 33/056* (2006.01)
*B08B 9/049* (2006.01)
*B03B 9/00* (2006.01)

(56) References Cited

U.S. PATENT DOCUMENTS

| | | | |
|---|---|---|---|
| 4,134,174 A * | 1/1979 | Flynn | E03F 9/00 |
| | | | 134/104.4 |
| 5,243,128 A | 9/1993 | Marcoz | |
| 5,341,539 A | 8/1994 | Sheppard et al. | |
| 5,374,352 A | 12/1994 | Pattee | |
| 6,082,630 A | 7/2000 | Bohrer | |
| 7,168,569 B2 | 1/2007 | Peresan | |
| 8,955,691 B2 | 2/2015 | Lister | |
| 9,010,544 B1 | 4/2015 | Miller | |
| 9,744,572 B2 | 8/2017 | Englent | |
| 2003/0155314 A1 | 8/2003 | Gordon | |
| 2007/0175804 A1* | 8/2007 | Kosanda | B01D 21/10 |
| | | | 210/85 |
| 2008/0121579 A1 | 5/2008 | Dierkes | |
| 2008/0314804 A1 | 10/2008 | Wojciechowski | |
| 2009/0100619 A1 | 4/2009 | Baird | |
| 2013/0037457 A1 | 2/2013 | Wojciechowski | |
| 2013/0037458 A1 | 2/2013 | Wojciechowski | |
| 2013/0098810 A1 | 4/2013 | Wojciechowski | |
| 2014/0131474 A1 | 5/2014 | Gansebom | |
| 2014/0196246 A1 | 7/2014 | Hetcher et al. | |

OTHER PUBLICATIONS

Vactor Manufacturing; "The Vactor 2100i Water Recycling System"; http://www.vactor.com/Products/CombinationSewerCleaners/NewWaterRecycler; web page printed Apr. 12, 2018; 2 pages.

Vactor Manufacturing; brochure for "Vactor 2100i"; Feb. 2018; 8 pages.

Mudtechnology International, Inc.; "Product and Service Information" leaflet; dated no later than Mar. 2, 2018; 2 pages.

Wikipedia "Belt Filter" Aug. 22, 2017; Retrieved online from https://en.wikipedia.org/w/index.php?title=Belt_filter&oldid=796620621 on Jun. 12, 2019; p. 1 para[0001].

United States Patent and Trademark Office; International Search Report and Written Opinion; PCT/US19/20590; Iwasaki-Higbee; dated Jul. 5, 2019; 23 pages.

United States Patent and Trademark Office; Invitation to Pay Additional Fees; PCT/US19/20590; Iwasaki-Higbee; dated May 8, 2019; 3 pages.

* cited by examiner

METHOD AND APPARATUS FOR CLEANING LARGE PIPES, SUCH AS STORM DRAIN CONDUITS

BACKGROUND OF THE INVENTION

The subject matter of this application relates to cleaning of conduits through which liquids are transported primarily by gravity flow, and in particular to a method and apparatus for cleaning storm drains, sanitary sewers and related conduits of accumulated clay, sand, gravel, trash and other sediment.

Underground conduits are used to drain many types of liquid wastes from numerous and varied sources and to transport such liquid wastes to places where they are accumulated for treatment or discharge into places such as large bodies of water. Periodic cleaning of such conduits is required to maintain their capacity. Various ways for cleaning sanitary sewers are well-known.

Storm drain conduits, more than sanitary sewers, are likely to suffer from accumulation of various materials introduced into them as a result of occasional heavy rains falling on city streets, parking lots, and other paved areas. Storm drain conduits also receive runoff that has originated as rainfall on open land or from snowmelt and that is drained through conduits ultimately discharging into storm drain conduit systems in suburban or urban areas.

Rocks, gravel, sand, mud, and other suspended materials are often carried into and through storm drain conduits by storm runoff that is high in volume. Once the runoff volume decreases after a storm the speed of water flow through a storm drain conduit is reduced. Once the speed of flow of water decreases below about 3 miles per hour a great deal of the material carried in storm runoff settles and becomes sediment on the bottom of a storm drain conduit, remaining in place once runoff from a particular storm subsides. Such sediments accumulate over time, often to the point of greatly impeding flow through such storm drain conduits so that subsequent storm runoff may be blocked to the point of backing up, leaving the storm drain conduits ineffective.

Various apparatus and methods are used to clean deposited materials from storm drain conduits at lesser cost than by manually digging such materials out and carting them away. Various ways of cleaning storm drain conduits use water to flush deposited materials from storm drain conduits, but commonly used step cleaning methods and equipment primarily designed for cleaning sanitary sewers require large amounts of clean water to flush deposits from such storm drain conduits. The costs for hauling clean water to storm drain conduit cleaning sites and for hauling away dirty water and the materials removed from the storm drain conduits are significant.

In one commercially used manner of cleaning sanitary sewers and storm drain conduits a nozzle arrangement called a sewer jet is provided with a very high pressure flow of water utilized to loosen sediment. The nozzle arrangement is sent a limited distance upstream through the drain conduit being cleaned, with the nozzles directing streams of highly-pressurized water in a downstream direction within the storm drain conduit. The nozzle arrangement is moved a limited distance upstream and then retracted in a downstream direction. Forceful streams of highly pressurized water from the nozzles, with pressures in excess of 1300 psi and usually in the range from 2000 psi to 3000 psi, are used to dislodge and loosen sediment and then the connecting hose is retracted to pull a portion of the loosened sediment and accompanying water back downstream to a location where access to the interior of the sewer is available. The dirty water and sediment can be collected by a vacuum truck, to be hauled away for separation and disposal. While some sewer cleaning units are equipped to provide higher volumes of pressurized water to the nozzle arrangement, most such units are limited to 80 gallons per minute.

For the very high pressure utilized in such known systems the water utilized must be clean of substantially all particles larger than 100 μm, in order to avoid destructive wear on the piston pumps utilized to develop the high pressures required. In one previously known apparatus for cleaning sanitary sewers, low viscosity dirty water and entrained sand, gravel, and other sediment removed from a sanitary sewer is pumped into a tank where sediment is allowed to settle out. Water is then removed from an upper portion of the tank through a screen and is cleaned further in a centrifugal cleaning device. The cleaned water is then reused for further sewer cleaning, but such a recycling system can only separate solids of a higher specific gravity from a slurry liquid with a very low viscosity as liquid has to pass a 100 μm screen. Materials loosened in storm drain conduits typically have a much higher concentration of suspended and colloidal solids. Further, with the exception of the blast from the nozzle, the volume of flow from the nozzle is not enough in and of itself to effect a flow in the conduits to convey the solids.

Storm drain conduits are often located along highways, and cleaning thus requires traffic control around the cleaning equipment. This may require the work to be done only during certain non-rush-hour periods of the day. In that case, set-up and tear-down of storm drain conduit cleaning equipment encroaches on the time during which storm drain conduits can be cleaned.

The number of large trucks involved in hauling clean water to and dirty water away from a site where a storm drain conduit is being cleaned using such conventional methods is expensive. Such trucks can also present problems for traffic in the vicinity and can cause undesirable wear and tear on streets and highways where storm drain conduits are being cleaned. Further, the clean water may be in precious supply due to location, and the dirty water still requires treatment for disposal or eventual reuse.

What is desired, then, is apparatus and a method for its use in cleaning conduits such as storm drain conduits of various sizes efficiently and without needing great amounts of water to be hauled to and away from a site where a conduit is being cleaned, thus saving clean water that could be used for other purposes, reducing traffic, and reducing costs to allow more storm drain conduits to be cleaned affordably keeping more sediments from going downstream contaminating our waterways.

SUMMARY OF THE INVENTION

The invention disclosed in the present application incorporates apparatus and methods for its use for flushing deposited sediment from conduits such as storm drain conduits of various sizes, and provides for repeated reuse of a quantity of water for cleaning such conduits.

In accordance with the method disclosed in this application, water that is not so clean as is required for the use of high-pressure piston pumps and small orifice nozzle tips can be used to wash sediment from a storm drain conduit. The presence of some mud or slurry, increasing its specific gravity and viscosity and thus the ability to loosen and convey heavier particles than clean water, may be desired in a flow of water used and reused to clean storm drains, pipes and sewers according to the disclosures herein, to increase efficiency and reduce waste of available production time.

In accordance with the disclosure herein a large-volume flow of water at a moderate pressure is directed through hose to a set of nozzles in a nozzle assembly to break up, dislodge and emulsify sediment within a pipe such as a storm drain conduit, and the water can then carry the sediment downstream within the storm drain conduit. The sediment-laden water can then be pumped from the downstream end of a length of storm drain conduit or other large pipe being cleaned.

Sediment-laden water may be removed from the storm drain conduit and screened to remove large items, gravel, and coarse sand. Sand may thereafter be removed centrifugally and the water, which may continue to contain substantial quantities of suspended solids such as clay or mud, and thus may have an increased viscosity and an increased specific gravity, may then again be pumped to the nozzle arrangement in the storm drain conduit or other pipe being cleaned, where the increased viscosity and specific gravity can facilitate moving material downstream through the storm drain conduit or other pipe being cleaned.

In one embodiment of the method disclosed in this application, a set of nozzles, fed with water by a pressurized hose, may be introduced at a downstream end of a length of storm drain conduit or other pipe needing to be cleaned. The force of a significant volume of water ejected from the nozzles at a significant exit velocity, in a generally downstream direction, may be used to propel the set of nozzles upstream through the storm drain conduit, and at the same time to pull along a water supply hose feeding the nozzles.

The foregoing and other objectives and features of the invention will be more readily understood upon consideration of the following detailed description of the invention taken in conjunction with the accompanying drawings.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION OF PREFERRED EMBODIMENTS

Figure 1:
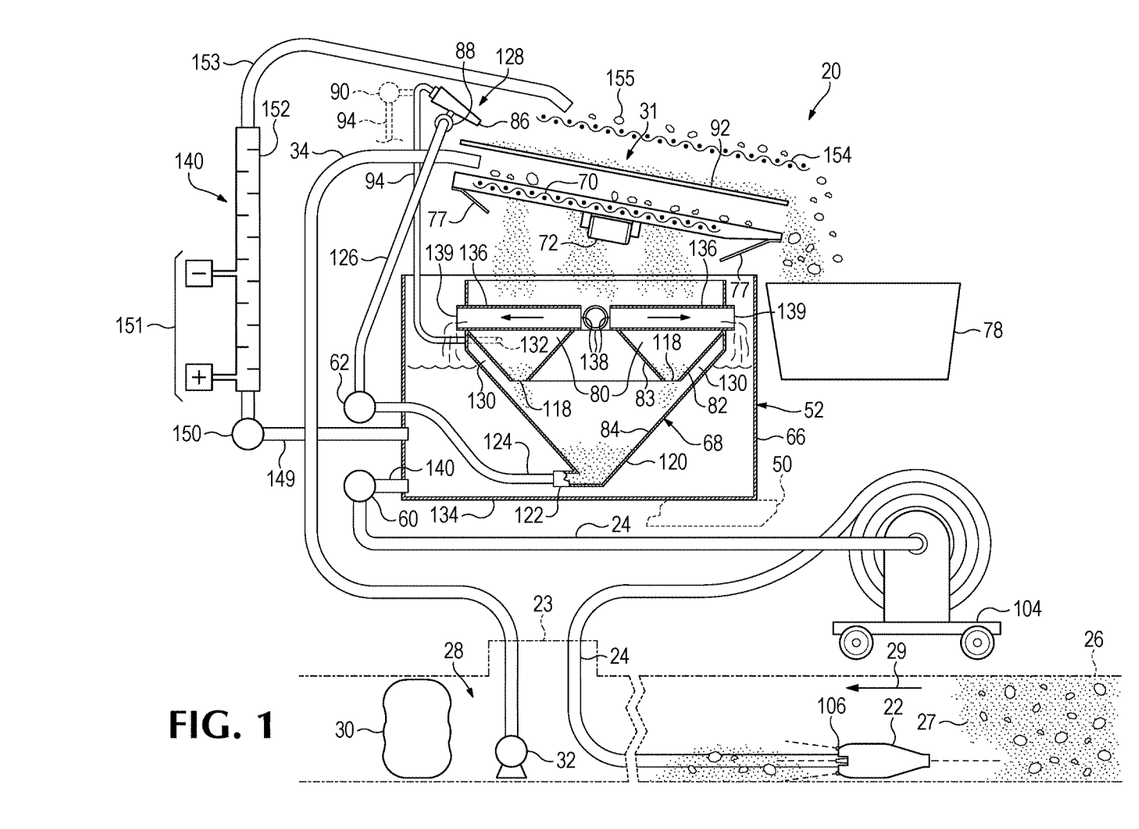
FIG. 1 is a partially schematic diagram of exemplary apparatus for use in cleaning accumulated sediments from a storm drain conduit.

Referring now to the drawings that form a part of the disclosure herein, a storm drain conduit cleaning system 20 shown in FIG. 1 utilizes a high-volume flow of water from a nozzle assembly 22 fed by a nozzle assembly feed hose 24. The nozzle assembly 22 may be introduced, through an access point such as a manhole 23, into a storm drain conduit 26 or similar conduit at a downstream end 28 of a length of the storm drain conduit 26 to be cleaned. A high-volume flow of water is discharged from the nozzle assembly 22 to break up and loosen accumulated sediment 27 and flush loosened sediment downstream through the storm drain conduit 26, in the direction of the arrow 29, toward the downstream end 28 of the length of storm drain conduit being cleaned.

A barrier 30 such as an inflatable body may be installed below the downstream end 28 of the segment to be cleaned, to block the downstream end of the segment and prevent water and entrained matter from proceeding further downstream. Dirty water, including the loosened sediment flushed downstream through the segment of the storm drain conduit 26 being cleaned, is collected at the outlet or downstream end 28 of the segment being cleaned, and is removed and introduced into a water cleaning system 31 shown in FIGS. 1 and 2. Depending to some extent upon the volume of water and the amount of sediment involved, the dirty water and suspended matter may be lifted from a point of collection at the downstream end 28 by use of a high-volume pump or sump pump 32 and then delivered to the cleaning system 31 through a suitable discharge conduit 34.

Figure 3:
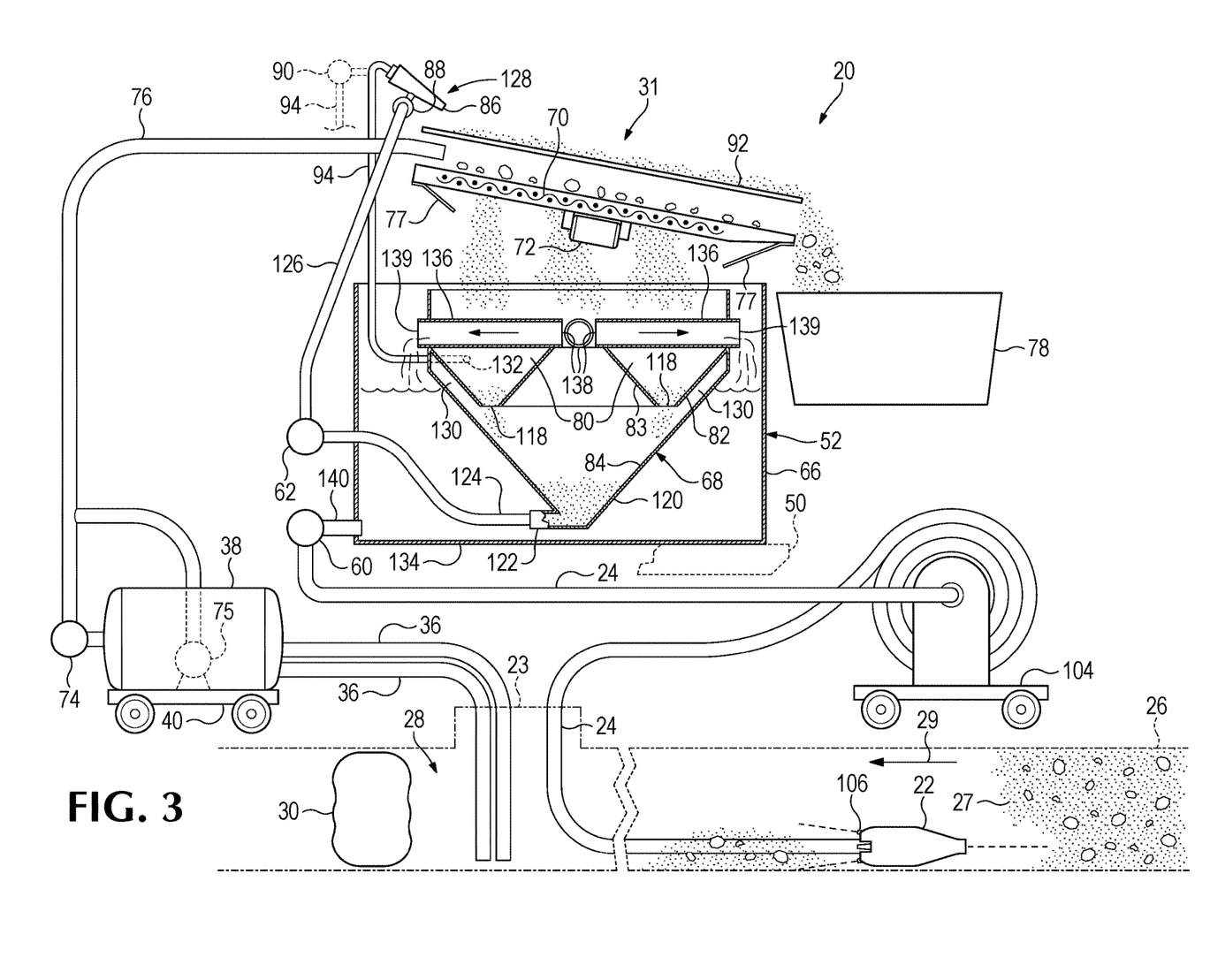
FIG. 3 is a partially schematic diagram of storm drain conduit cleaning apparatus that is a variation of the apparatus shown in FIG. 1.

Alternatively, as shown in FIG. 3, the dirty water and included sediment may be removed from the point of collection at the downstream end 28 through one or more suction hoses 36 and conducted to a vacuum tank 38 that may be carried on a truck 40. Those liquids and entrained solids can then be pumped through conduit 76 to deliver them to cleaning system 31.

In either case, the sediment that has been transported downstream through the length of storm drain conduit 26 being cleaned is removed at the downstream end 28, together with the water that had been delivered into the storm drain conduit 26 by the nozzle assembly 22. In the water cleaning system 31 much of the sediment is separated out, and the water is cleaned sufficiently to permit it to be pumped again to the nozzle assembly 22, where it is used again to break up, loosen, and flush additional sediment to the downstream end 28 of the length of storm drain conduit 26 being cleaned.

Figure 2:
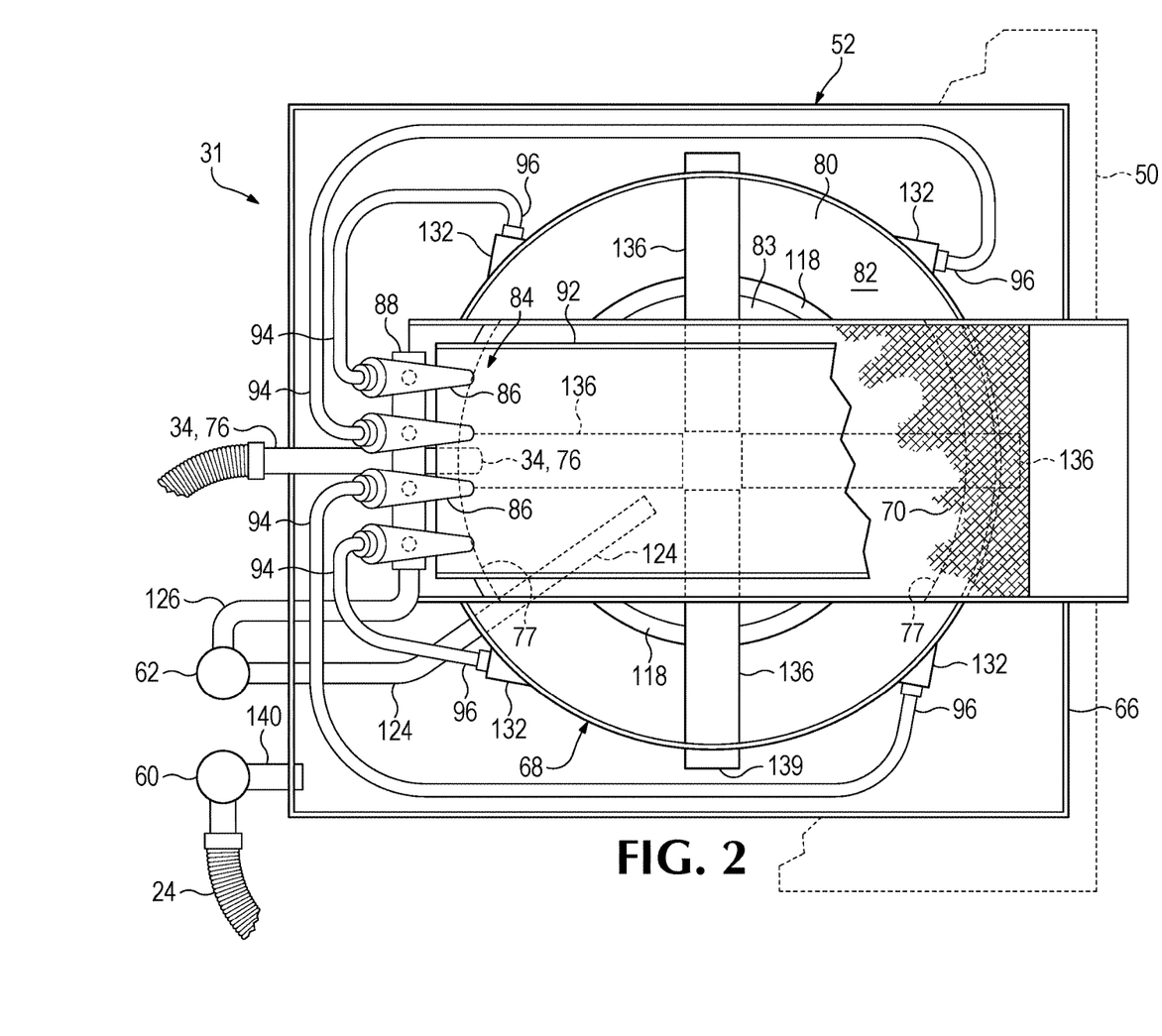
FIG. 2 is a top plan view of a portion of the apparatus shown in FIG. 1.
Figure 4:
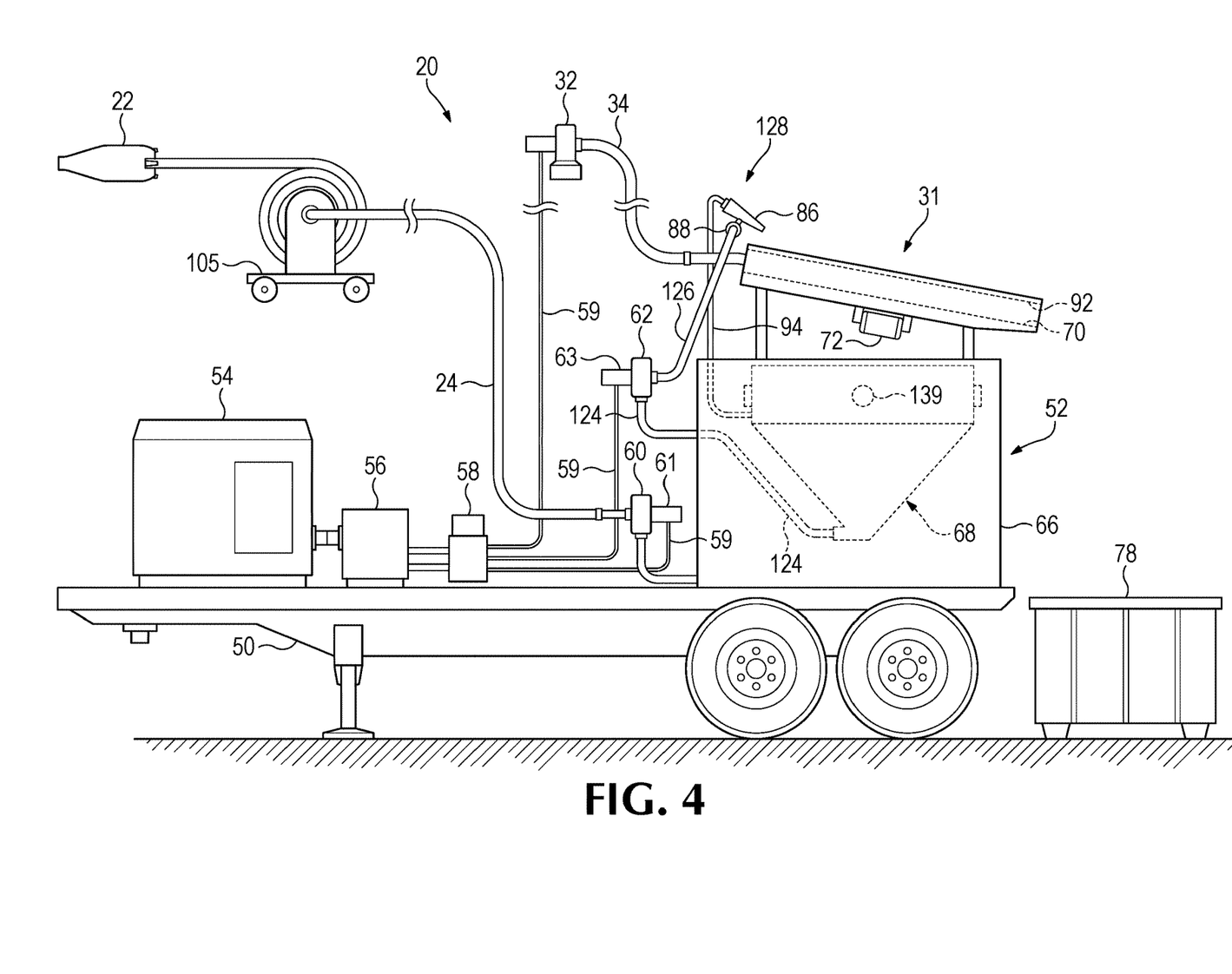
FIG. 4 is a somewhat schematic illustration of an integrated, easily transported arrangement including the storm drain conduit cleaning apparatus shown in FIGS. 1 and 2.

Referring now also to FIG. 4, the storm drain conduit cleaning system 20 may include a suitable supporting framework to make the system mobile, i.e., a skid, flatbed, roll-off box, a truck, or a trailer 50 on which a water cleaning tank system 52 and other components of the water cleaning system 31 shown in FIGS. 1 and 2 are located. The water cleaning system 31 includes a power supply 54 such as an internal combustion engine, arranged to drive a hydraulic fluid pump or electric generator 56 of suitable capacity to drive pumps. A suitable control system 58 mounted on the truck or trailer may be arranged to control the power supply 54 and provide electrical or hydraulic power through conduits 59 to motors arranged to drive various water pumps included in the storm drain conduit cleaning system 20, as will be described presently.

The water cleaning system 31 may include a nozzle assembly supply pump 60 driven by a motor 61 and a water cleaning system pump 62 driven by a motor 63, all mounted on the truck or trailer 50. Both water pumps 60 and 62 may be high-volume centrifugal pumps driven by the motors 61 and 63, regulated by the control system 58 also mounted on the truck or trailer 50. The nozzle assembly supply pump 60 should have a capacity of at least 350 gallons per minute at an output pressure of at least 100 psi. A higher capacity output would be desired in some large diameter storm sewers, and may be accomplished economically with the addition of pumps added either in parallel, in series, or both.

The water cleaning system pump 62 does not need to have a volumetric capacity equal to that of the nozzle system supply pump 60, nor does it need as great a pressure capacity. For the sake of simplicity and economy of repair and maintenance, however, it may be economically efficient for both the nozzle system supply pump 60 and the water cleaning system pump 62 to be of the same type and capacity.

Referring again to FIGS. 1 and 2, the water cleaning system 31 includes the water cleaning tank system, which may include a main reservoir or outer tank 66 and also includes a vortex sediment separator tank 68 that may be located centrally within the outer tank 66. At least the lower part 120 of the vortex separator tank 68 may be generally conical and may be spaced a small distance above the bottom 134 of the outer tank 66.

Supported above the main tank 66 of the water cleaning system is a sloped screen 70 driven to vibrate, as by a vibrator motor 72. The screen 70 may have a size 10 mesh, for example. Dirty water and entrained materials pumped from the collection area at the downstream end 28 of the length of storm drain conduit 26 being cleaned are conducted through the conduit 34 from the sump pump 32 and discharged onto the screen 70, as shown in FIGS. 1 and 2. Alternatively, as shown in FIG. 3, uncleaned water and included materials may be delivered from the vacuum tank 38 to the screen 70 by a pump 74 outside the vacuum tank 38, or by a pump 75 within the tank 38, or the vacuum tank may be pressurized later to force the dirty water through a suitable conduit 76.

Rocks, gravel, and grit larger than coarse sand are removed from the flow of dirty water by the screen 70 and roll, bounce, or slide down the screen 70 to a suitable collection bin 78 to be carried away. The screened water and suspended material small enough to pass through the screen fall into the top of the vortex separator tank 68, passing over intersecting horizontal pipes 136, into a circular trough 80. Pans 77 may be provided beneath the portions of the screen 70 to direct screened water into the trough 80 and prevent it from dropping directly into the portion of the main tank 66 outside the vortex sediment separator tank 68.

The circular trough 80 may resemble a pair of funnels arranged concentrically, but oppositely, with a wide-mouth outer funnel 82 being an outer wall of the circular trough 80, and with an inverted funnel 83 centered within the outer funnel 82, with its smaller end abutting against and interconnected with the intersection of the horizontal pipes 136. The outer rim of the inverted funnel 83 is located at the same height as the mouth, or inner rim, of the outer funnel 82 and is of a slightly smaller diameter than the mouth of the outer funnel 82, so that the lower margins of the funnels 82 and 83 define a circular slot 118. Sand and other fine particulate material suspended in the water that has passed through the screen 70 can descend through the trough 80 and exit through the slot 118 near the inner surface of the vortex separator tank 68. The particulate material can then settle toward the bottom of the conical lower portion 120 of the vortex separator tank 68, where a discharge port 122 is provided.

A discharge conduit 124 leads water and entrained sediment from the discharge port 122 at the bottom of the conical lower portion 120 to the cleaning system pump 62. The cleaning system pump 62 delivers the water through a conduit 126 to a sand removal apparatus 128 that removes a large majority of entrained sand from the water and returns the substantially sand-free water into a space 130 between the outer funnel-shaped wall 82 of the circular trough 80 and the wall 84 of the vortex separator tank 68, preferably through tangentially oriented ports 132 that encourage spiral flow downward toward the bottom of the vortex sediment separator tank 68.

The sand removal apparatus 128 may, for example, include a group of devices 86 called desander cones that utilize centrifugal action to remove the heavier-than-water sand particles from the water received from the cleaning system pump 62. Such desander cones 86 are available, for example, from Tibban Mfg. Inc., as its Tetragrene model MP 380112-1-T. Each such desander cone 86 may have a capacity of about 165 gallons per minute of dirty water at a nominal supply pressure of 30-50 pounds per square inch. As shown in FIGS. 1-3, then, several such desander cones 86 may be used in parallel, all connected to an inlet header 88 and each connected to a respective outlet conduit 94. Alternatively, all the desander cones 86 may discharge water into an outlet header 90, shown in broken line in FIGS. 1 and 3, leading to one or more outlet conduits 94. While four desander cones 86 are shown in FIG. 2, it may be desirable to utilize five or more. Sand removed from the screened water by the desander cones 86 is deposited and accumulated on a sloped screen 92 that may have a size 100 mesh and may be conveniently located above the screen 70. The sand can slide down the screen 92 into the collection box 78, to be collected with the gravel and other materials separated from the water by the screen 70, for eventual disposal or use for fill. Most residual water discharged with sand from the desander cones 86 passes through both screen 92 and screen 70, returning to the vortex sediment separator tank 68.

Each outlet conduit 94 may have an outlet end portion 96 connected to a respective one of the tangential ports 132 spaced apart around the circumference of the vortex separator tank 68. The ports 132 are preferably oriented to direct the water discharged from it in a spiral flow pattern in the space 130 that may assist in causing sand and other suspended material exiting the circular trough 80 through the slot 118 to settle near the bottom of the conical lower portion 120 of the vortex separator tank 68.

As a result of the circulation described, the cleanest water in the vortex separator tank 68 is likely to be found near the center of the upper surface of the water surrounded by the inverted funnel 83, and thus surrounded by the circular trough 80, where the horizontal pipes 136 extend across the center of the top of the vortex separator tank 68. These pipes have large openings 138 in the bottom of each near the center of the vortex separator tank 68, and relatively clean water can enter the pipes 136 through the openings 138 and be discharged into the surrounding outer tank 66 through the open outer end 139 of each pipe 136.

After removal of sand from the screened water the suspended material remaining in the water flowing through the pipes 136 into the outer tank 66 is primarily mud or clay and is of very small particle size. Such particle size may, however, be mostly too great for such water to be pumped through the high-pressure pumps utilized currently in commercially available storm drain conduit cleaning systems without causing unacceptable wear. Such water including such suspended material, however, can reliably be pumped by the nozzle system supply pump 60 and cleaning system pump 62 at the significantly lower pressures required by the sewer cleaning system 20 described above, yet at a pressure and volume of flow adequate for dislodging and transporting accumulated material in storm drain 27 to the downstream end 28.

The cleaned water in the main, or outer, water tank 66 of the water cleaning tank system 52 is available to be removed through a discharge port to the nozzle assembly supply pump 60. The nozzle assembly supply pump 60 provides the cleaned water to the nozzle assembly feed hose 24, part of which may preferably be wound on a suitable hose reel 104 that can support the hose while it is pressurized. The nozzle assembly feed hose 24 can thus be extended as required while delivering water to the nozzle assembly 22. While a single nozzle assembly feed hose 24 is preferable, where the flow of water required is greater than 400 gallons per minute it may be desirable to use a pair of parallel nozzle assembly feed hoses 24 in order to facilitate handling the hoses and to facilitate bending the hoses as may be required for them to pass through access openings such as storm sewer catch basins and manholes 23 and/or into an available downstream end 28 of a length of a storm drain conduit 26 or other conduit that is to be cleaned.

It is critical that the nozzle assembly feed hose 24 be of ample strength and size to carry the desired amount of water. It is also desirable that the nozzle assembly feed hose 24 be both flexible and as close to neutral or even positive buoyancy as possible, to minimize friction, as will be explained below. One such hose available would be Kuri Teck K-Tough hose sold by Kuriyama of America, Inc. which has a specific gravity of about 1.42.

Figure 5:
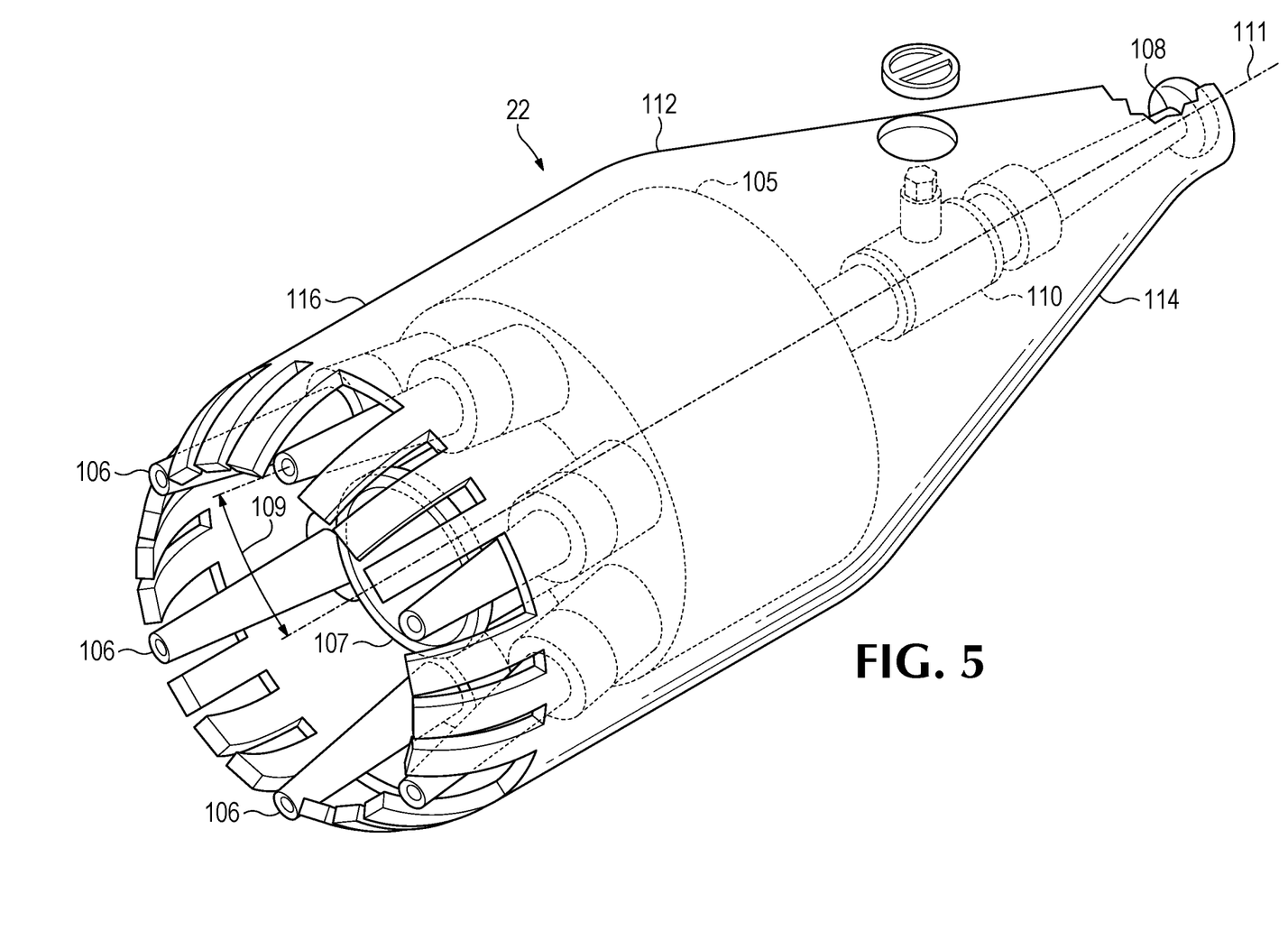
FIG. 5 is a partially cutaway isometric drawing of a nozzle system that may be used as a part of the apparatus disclosed herein for cleaning accumulated sediments from a storm drain conduit.

As may be seen best in FIG. 5, the nozzle assembly 22 may include a receiver-manifold 105 including a rear end to which the nozzle assembly feed hose 24 may be suitably coupled by a conventional coupler 107. A plurality of nozzles 106, for example six, are mounted on the receiver-manifold 105 and connected so as to be supplied with water from the nozzle assembly feed hose 24 with minimal loss of pressure. The nozzles 106 are directed rearwardly and back along the nozzle assembly feed hose 24 and diverge from each other at a respective acute angle 109, of 0-40 degrees, for example, from a central axis 111 of the nozzle assembly 22. The nozzle assembly 22 can thus provide a strong, high-volume, stream of water from each nozzle 106, directed so as to urge the nozzle assembly 22 along the conduit being cleaned and also direct the stream of water from each nozzle 106 toward the interior surface of the storm drain conduit 26, to loosen sediment from the storm drain conduit 26 and wash it downstream within the conduit 26.

The nozzles 106 can cumulatively provide enough water flow volume to carry the loosened sediment downstream within the storm drain conduit 26 toward the downstream end 28 of a length of the storm drain conduit 26 that is being cleaned. For example, six nozzles 106, each having a circular outlet orifice with a diameter of ½ inch can deliver a total of at least 350 gallons per minute, with a nozzle exit velocity in the range of 90-125 feet per second, thus at least 90 feet per second and preferably at least 115 feet per second, when the pressure at the outlets of the nozzles is at least about 100 psi. This volume is sufficient to carry sediment downstream within a storm drain conduit having a diameter of 24 inches, even at a very shallow grade. At the same time, with the six nozzles 106 directed as described, the combined thrust from the nozzles 106 is sufficient to propel the nozzle assembly 22, together with the nozzle assembly feed hose 24, upstream a considerable distance along a length of storm drain conduit 26 that is being cleaned. The previously-mentioned desired buoyancy of the nozzle assembly feed hose 24 is intended to facilitate movement of the nozzles by reducing friction between the nozzle assembly feed hose 24 and the bottom of the storm drain conduit 26.

An additional, forwardly-directed nozzle 108 and an associated control valve 110 mounted on the receiver-manifold 105 make it possible to provide a forwardly-directed stream of water from the nozzle assembly 22 to loosen sediment in a storm drain conduit 26 that is so completely obstructed by accumulated sediment that there is insufficient room for the nozzle assembly 22 to proceed upstream before some of the sediment is loosened and moved. Where the segment of storm drain conduit 26 to be cleaned already defines a sufficiently open path the control valve 110 can be closed so all of the water passing through the nozzle assembly 22 can assist in moving the nozzle assembly 22 upstream.

A protective housing 112 defining ample openings corresponding with the locations of the nozzles 106 and 108 may be provided to facilitate movement of the nozzle assembly 22 within a storm drain conduit 26 and avoid having the nozzle assembly 22 be snagged on a sewer wall surface irregularity or on a rock or other piece of sediment. The housing 112 may, for example, include an outer shell of a strong, tough, low-friction plastic, such as HDPE, having a modified cylindrical, or bullet, shape, with tapered ends 114 and 116, and openings at the ends for the nozzle assembly feed hose 24 and the nozzle 108.

The nozzle assembly supply pump 60 is capable of delivering to the nozzle assembly 22 enhanced but still dirty water, that is, water which has been screened, and from which sand has been removed, but which includes suspended clay and mud. Such dirty water has a greater viscosity and specific gravity than clean water and thus is capable of providing greater support for the conveyance of sand and gravel loosened by the flow of such water from the nozzles. Additionally, the greater volume of such dirty water provided within a storm drain conduit being cleaned by the storm drain conduit cleaning system 20 disclosed herein (by comparison with the well-known sewer cleaning systems using high-pressure low-volume sewer jets) effectively carries loosened sediment downstream through the section of storm drain conduit being cleaned. Loosened sediment thus does not need to be pulled downstream by retracting the nozzle assembly periodically, as is necessary in previously known step cleaning methods for cleaning storm drain conduits.

As a result of the nozzle assembly 22 being able to propel itself and bring the nozzle assembly feed hose 24 along, and since operation can be continuous and is independent of ability of trucks to provide clean water, lengthy segments of a pipe 26, at least as long as 200 feet, can be cleaned before the nozzle assembly 22 and nozzle assembly feed hose 24 must be moved to an access opening at the downstream end 28 of another segment of the pipe or storm drain conduit 26 being cleaned. This can greatly reduce the time needed for cleaning a storm drain conduit 26, by comparison with the conventional methods.

Figure 6:
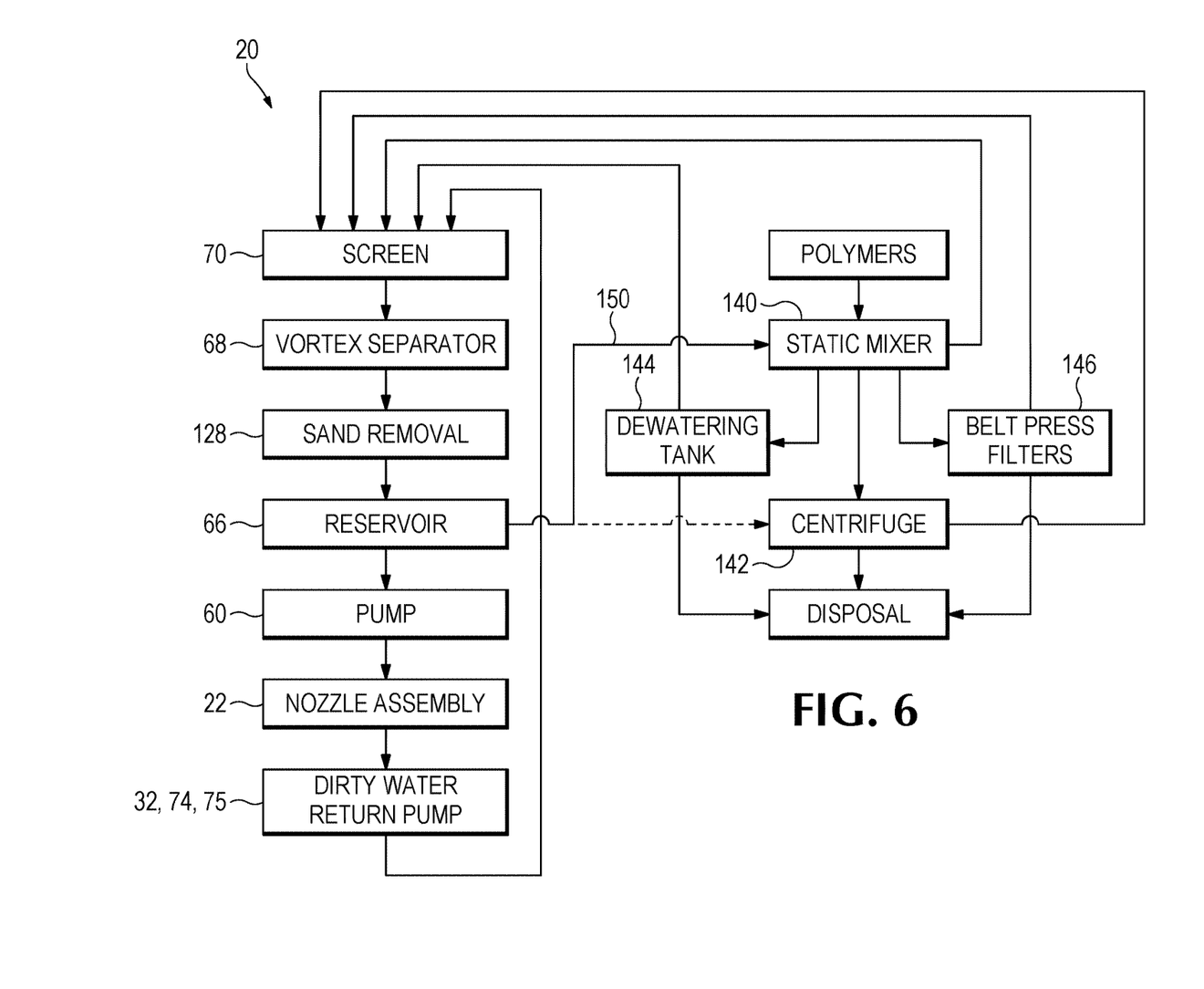
FIG. 6 is a schematic illustration of the apparatus for use in cleaning accumulated sediments from a storm drain conduit and preparing the dirty water for further use.

Water can be reused after treatment as shown schematically in FIG. 6. It will be understood that reused water from which gravel and sand have been removed will accumulate quantities of clay and mud and will thus become more and more dense and viscous with continued recirculation through the storm drain conduit cleaning system 20. For example, it is desired to eventually have a slurry of water and entrained mud and clay with a specific gravity of at least about 1.05 and at least viscosity similar to that of heavy whipping cream. Once viscosity is so high that it degrades the ability of the dirty water to pass through the primary screen 72, and thus periodically during the course of operation of the storm drain conduit cleaning system 20, a portion of the suspended solids and mud can be removed from the dirty water, as by mixing in polymers 151 that use ionic charges to coagulate the particles suspended in the dirty water and separate them from the relatively clear water. This may be accomplished by removing a portion of the dirty water from the reservoir tank 66 via a conduit 149 to a third smaller pump 150 and pumping it into a static mixer 152 where polymers 151 of either positive or negative charge, or both, are added to mix with and separate some of the suspended solids from the clear water. Then both the water and coagulated solids are sent to either a special screen 154 or to the primary screen 70. The clear water passes through the screen and the coagulated lumps 155 of solids bounce down the screen 70 to the solids collection box 78 to be mixed with the other solids. The relatively clear water is then returned into the circuit as it mixes with incoming dirty water and passes into the vortex separator tank 68, thus lowering the viscosity of the dirty cleaning water.

For example, coagulating polymers can be mixed with water containing a great deal of suspended solids, using a static mixer 140, basically a long pipe 152, into which the polymers can be injected, as shown in FIG. 1. Dirty water can be supplied from the tank 66 through a conduit 149, using a pump 150 through which the dirty water is made to flow into the static mixer 140. The polymers may be of positive and negatively charged types that cause suspended small particles to coalesce. The pipe 152 is preferably equipped with internal baffles which cause the flow of water through the pipe 152 to be turbulent enough to mix the polymers with the dirty water efficiently as both pass through, so that the polymers can cause the matter suspended within the water to coagulate and coalesce, enabling the coagulated solids to be removed from the water more easily as by the polymer-treated water proceeds from the static mixer 140 through a conduit 153 to the screen 70, or a separate additional screen 154 above it, existing specifically for keeping coagulated solids 155 bouncing down its surface while allowing water to pass through all three screens back into the vortex separator.

Removal of suspended solid material, particularly once it has been coagulated by the use of polymers, can also be accomplished using centrifuges 142 that are well-known for use in water purification plants for removing suspended material from water.

Alternatively, so that the water can be reused in the storm drain conduit cleaning system 20 described above, the coagulated entrained solid material can be removed from water, after the use of polymers, simply by allowing the water to drain from the suspended solids in a dewatering tank 144. Such a dewatering tank 144 may, for example, be a large cylindrical tank lined with a porous layer through which water can pass and then flow to an outlet at an end of the cylindrical tank to be collected for reuse. The drained coagulated solid material remaining within the dewatering tank 144 can then be removed, as through a door at an end of the tank, to be disposed of appropriately.

Some water can be reclaimed from separated but wet sediment by treating the wet sediment in a belt filter press 146. The wet material is spread upon a wide, porous, moving belt and then passed beneath a second belt. The two belts are squeezed together and remaining water is pressed from the sediment and collected beneath the belts so that the water can be reused in the storm drain conduit cleaning system 20. The remaining solid materials are then scraped from the belts for collection and disposal.

It will be appreciated that the present invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

What is claimed is:

1. Pipe cleaning apparatus for cleaning a large pipe such as a storm sewer, comprising:
    (a) a container for a supply of water;
    (b) a delivery pump supplied with water from the container and capable of delivery of at least 350 gallons per minute at a pressure in excess of 100 psi;
    (c) a nozzle assembly;
    (d) a supply conduit arranged to deliver water from the delivery pump to the nozzle assembly at a rate of at least 350 gallons per minute at a pressure in excess of 100 psi;
    (e) dirty water removal apparatus capable of moving dirty water from a downstream end of a length of pipe at a rate at least equal to a rate at which water from the container is delivered through the supply conduit and discharged through the nozzle assembly, together with entrained or suspended gravel, sand, and mud;
    (f) a dirty water delivery conduit arranged to deliver dirty water from the dirty water removal apparatus to a water cleaning system; and
    (g) the water cleaning system arranged to receive the dirty water from the dirty water delivery conduit, separate entrained solids from the dirty water to a predetermined degree, and deliver cleaned water thereafter to the container, the water cleaning system being capable of cleaning the dirty water sufficiently for the cleaned water to be reused at the rate at which the dirty water is delivered to the water cleaning system by the dirty water removal apparatus, and in quantities sufficient to supply continuously an adequate amount of cleaned water to the container to supply the delivery pump, wherein the water cleaning system includes a sloped screen and a vibrator motor that vibrates the sloped screen, the sloped screen being arranged to receive a flow of dirty water from the dirty water delivery conduit and to separate objects larger than a predetermined size from the flow of dirty water and to allow the flow of dirty water, from which the objects greater than said predetermined size have been separated, to pass through the sloped screen.

2. The pipe cleaning apparatus of claim 1 including a mixer arranged to add coagulating materials to the dirty water.

3. The pipe cleaning apparatus of claim 2, wherein the dirty water delivery conduit is arranged to deliver dirty water mixed with coagulating materials to the water cleaning system.

4. The pipe cleaning apparatus of claim 1 wherein the water cleaning system leaves enough suspended solid materials in the water to deliver water having a specific gravity of at least 1.05 to the container.

5. The pipe cleaning apparatus of claim 1, wherein the water cleaning system further includes:
(i) a tank associated with the screen and arranged to receive and contain a quantity of water that has passed through the screen;
(ii) a sand separator;
(iii) a pump and a first conduit arranged to remove water from the tank and deliver it to the sand separator; and
(iv) a second conduit arranged to deliver water from the sand separator to the tank after sand has been separated from the water.

6. The pipe cleaning apparatus of claim 5 including a mixer arranged to add a quantity of coagulating material to a portion of the flow of dirty water.

7. The pipe cleaning apparatus of claim 6 including a centrifuge arranged to remove coagulated solids from the water to which coagulating material has been added.

8. The pipe cleaning apparatus of claim 6 including a dewatering box or tank arranged to remove coagulated solids from the flow of water to which coagulating material has been added.

9. Pipe cleaning apparatus for cleaning a large pipe such as a storm sewer, comprising:
(a) a container for a supply of water;
(b) a delivery pump supplied with water from the container;
(c) a nozzle assembly;
(d) a supply conduit arranged to deliver water from the delivery pump to the nozzle assembly;
(e) dirty water removal apparatus capable of moving dirty water, together with entrained or suspended gravel, sand, and mud, from a downstream end of a length of pipe being cleaned, at a rate at least equal to a rate at which water from the container is delivered through the supply conduit and discharged through the nozzle assembly into the pipe being cleaned;
(f) material separation apparatus adapted to remove rocks and other solid items having at least a predetermined size from the dirty water while allowing suspended particulate material no larger than the predetermined size to accumulate in the dirty water and thereby to increase viscosity and specific gravity of the dirty water, thereby producing enhanced dirty water; and
(g) dirty water return apparatus arranged to return enhanced dirty water from the material separation apparatus to the container after solids larger than the predetermined size have been removed, to make the dirty water available for reuse in an enhanced condition,
wherein the material separation apparatus includes a sloped screen and a vibrator motor that vibrates the sloped screen, the sloped screen being arranged to receive the dirty water and to separate the rocks and the other solid items from the dirty water and to allow the dirty water, from which the rocks and the other solid items have been separated, to pass through the sloped screen.

10. The pipe cleaning apparatus of claim 9 wherein the material separation apparatus is adapted to remove sand and gravel from the dirty water, leaving smaller particles of material suspended in the enhanced dirty water when returning the enhanced dirty water to the container.

11. The pipe cleaning apparatus of claim 9 wherein the material separation apparatus is adapted to coagulate and remove a quantity of suspended particulate matter from the dirty water.

12. The pipe cleaning apparatus of claim 9 including a conduit arranged to deliver dirty water mixed with coagulating materials to the water cleaning system.

13. The pipe cleaning apparatus of claim 9 wherein the material separation apparatus leaves enough suspended solid materials in the dirty water to deliver enhanced dirty water having a specific gravity of at least 1.05 to the container.

14. The pipe cleaning apparatus of claim 9 wherein the delivery pump, the supply conduit, and the nozzle assembly are capable of discharging water from the nozzle assembly with a nozzle exit velocity in the range of 90-125 feet per second.

15. The pipe cleaning apparatus of claim 9 wherein the delivery pump, the supply conduit, and the nozzle assembly are capable of discharging water from the nozzle assembly at a rate of at least 350 gallons per minute.

16. Pipe cleaning apparatus for cleaning a large pipe such as a storm sewer, comprising:
(a) a container for a supply of water;
(b) a delivery pump supplied with water from the container and capable of delivery of at least 350 gallons per minute at a pressure in excess of 100 psi;
(c) a nozzle assembly;
(d) a supply conduit arranged to deliver water from the delivery pump to the nozzle assembly at a rate of at least 350 gallons per minute at a pressure in excess of 100 psi;
(e) dirty water removal apparatus capable of moving dirty water from a downstream end of a length of pipe at a rate at least equal to a rate at which water from the container is delivered through the supply conduit and discharged through the nozzle assembly, together with entrained or suspended gravel, sand, and mud;
(f) a dirty water delivery conduit arranged to deliver dirty water from the dirty water removal apparatus to a water cleaning system; and
(q) the water cleaning system arranged to receive the dirty water from the dirty water delivery conduit, separate entrained solids from the dirty water to a predetermined degree, and deliver cleaned water thereafter to the container, the water cleaning system being capable of cleaning the dirty water sufficiently for the cleaned water to be reused at the rate at which the dirty water is delivered to the water cleaning system by the dirty water removal apparatus, and in quantities sufficient to supply continuously an adequate amount of cleaned water to the container to supply the delivery pump,
wherein the water cleaning system includes:
(i) a screen arranged to receive a flow of dirty water from the dirty water delivery conduit and to separate objects larger than a predetermined size from the flow of dirty water and to allow the flow of dirty water, from which the objects greater than said predetermined size have been separated, to pass through the screen;
(ii) a tank associated with the screen and arranged to receive and contain a quantity of water that has passed through the screen;
(iii) a sand separator;
(iv) a pump and a first conduit arranged to remove water from the tank and deliver it to the sand separator; and (v) a second conduit arranged to deliver water from the sand separator to the tank after sand has been separated from the water, wherein the container includes the tank.

17. The pipe cleaning apparatus of claim 16 wherein the tank is a vortex separator.

18. The pipe cleaning apparatus of claim 16, wherein the screen is a vibrating screen.

19. The pipe cleaning apparatus of claim 16, wherein the sand separator utilizes centrifugal action to remove heavier-than-water sand particles from the water received from the pump.

20. Pipe cleaning apparatus for cleaning a large pipe such as a storm sewer, comprising:
   (a) a container for a supply of water;
   (b) a delivery pump supplied with water from the container and capable of delivery of at least 350 gallons per minute at a pressure in excess of 100 psi;
   (c) a nozzle assembly;
   (d) a supply conduit arranged to deliver water from the delivery pump to the nozzle assembly at a rate of at least 350 gallons per minute at a pressure in excess of 100 psi;
   (e) dirty water removal apparatus capable of moving dirty water from a downstream end of a length of pipe at a rate at least equal to a rate at which water from the container is delivered through the supply conduit and discharged through the nozzle assembly, together with entrained or suspended gravel, sand, and mud;
   (f) a dirty water delivery conduit arranged to deliver dirty water from the dirty water removal apparatus to a water cleaning system; and
   (q) the water cleaning system arranged to receive the dirty water from the dirty water delivery conduit, separate entrained solids from the dirty water to a predetermined degree, and deliver cleaned water thereafter to the container, the water cleaning system being capable of cleaning the dirty water sufficiently for the cleaned water to be reused at the rate at which the dirty water is delivered to the water cleaning system by the dirty water removal apparatus, and in quantities sufficient to supply continuously an adequate amount of cleaned water to the container to supply the delivery pump, wherein the water cleaning system includes:
   (i) a screen arranged to receive a flow of dirty water from the dirty water delivery conduit and to separate objects larger than a predetermined size from the flow of dirty water and to allow the flow of dirty water, from which the objects greater than said predetermined size have been separated, to pass through the screen;
   (ii) a tank associated with the screen and arranged to receive and contain a quantity of water that has passed through the screen;
   (iii) a sand separator;
   (iv) a pump and a first conduit arranged to remove water from the tank and deliver it to the sand separator; and
   (v) a second conduit arranged to deliver water from the sand separator to the tank after sand has been separated from the water, wherein the sand separator includes a centrifugal sand removal apparatus arranged to separate sand from a quantity of water delivered under pressure from the tank to the sand removal apparatus and thereafter to deliver water from which sand has been separated to the tank, and a second pump arranged to remove water from the tank and deliver it under pressure to the centrifugal sand removal apparatus.

21. The pipe cleaning apparatus of claim 20, wherein the screen is a vibrating screen.

22. The pipe cleaning apparatus of claim 20, wherein the centrifugal sand removal apparatus removes heavier-than-water sand particles from the water received from the pump.

23. The pipe cleaning apparatus of claim 22, wherein the tank is arranged to further receive and contain sand particles other than the heavier-than-water sand particles removed by the centrifugal sand removal apparatus.

24. The pipe cleaning apparatus of claim 23, wherein the tank includes a conical lower portion, wherein at least a portion of the sand particles other than the heavier-than-water sand particles settle near a bottom of the conical lower portion.

* * * * *